United States Patent
Jirjis et al.

(10) Patent No.: US 7,494,679 B2
(45) Date of Patent: *Feb. 24, 2009

(54) METHOD AND APPARATUS FOR PROCESSING VEGETABLE OIL MISCELLA, METHOD FOR CONDITIONING A POLYMERIC MICROFILTRATION MEMBRANE, MEMBRANE, AND LECITHIN PRODUCT

(75) Inventors: Bassam Jirjis, Plymouth, MN (US); Harapanahalli S. Muralidhara, Plymouth, MN (US); Dennis D. Otten, Elk River, MN (US)

(73) Assignee: Cargill Incorporated, Wayzata, MN (US)

( * ) Notice: Subject to any disclaimer, the term of this patent is extended or adjusted under 35 U.S.C. 154(b) by 480 days.

This patent is subject to a terminal disclaimer.

(21) Appl. No.: 10/958,714

(22) Filed: Oct. 4, 2004

(65) Prior Publication Data

US 2005/0118313 A1    Jun. 2, 2005

Related U.S. Application Data

(63) Continuation of application No. 10/202,294, filed on Jul. 23, 2003, now Pat. No. 6,833,149, which is a continuation-in-part of application No. 09/483,346, filed on Jan. 14, 2000, now abandoned, which is a continuation-in-part of application No. 09/231,692, filed on Jan. 14, 1999, now Pat. No. 6,207,209.

(51) Int. Cl.
A23D 9/02 (2006.01)

(52) U.S. Cl. .............. 426/330.6; 426/417; 426/422; 554/175; 554/177; 210/650; 210/651

(58) Field of Classification Search ............... 426/330.6
See application file for complete search history.

(56) References Cited

U.S. PATENT DOCUMENTS

| | | | |
|---|---|---|---|
| 3,878,232 A | 4/1975 | Hayes et al. | |
| 4,062,882 A | 12/1977 | Sen Gupta | |
| 4,093,540 A * | 6/1978 | Sen Gupta | ............ 554/80 |
| 4,235,793 A | 11/1980 | Betzing | |
| 4,414,157 A | 11/1983 | Iwama et al. | |
| 4,420,205 A | 12/1983 | Kirkman | |
| 4,442,034 A | 4/1984 | Suzuki et al. | |
| 4,495,207 A | 1/1985 | Christianson et al. | |
| 4,496,489 A | 1/1985 | Sen Gupta | |
| 4,533,501 A * | 8/1985 | Sen Gupta | ............ 554/184 |
| 4,588,745 A | 5/1986 | Bessler | |
| 4,645,677 A | 2/1987 | Lawhon et al. | |
| 4,787,981 A | 11/1988 | Tanahashi et al. | |
| 4,797,200 A | 1/1989 | Osterhuber | |
| 4,960,544 A | 10/1990 | Van Putte et al. | |
| 5,066,504 A | 11/1991 | Asbeck et al. | |
| 5,089,139 A | 2/1992 | Asbeck | |
| 5,166,376 A | 11/1992 | Suzuki et al. | |
| 5,207,917 A | 5/1993 | Weaver | |
| 5,310,487 A | 5/1994 | LaMonica | |
| 5,358,625 A | 10/1994 | Gould | |
| 5,360,530 A | 11/1994 | Gould et al. | |
| 5,374,356 A | 12/1994 | Miller | |
| 5,466,782 A | 11/1995 | Rousset | |
| 5,494,566 A | 2/1996 | Gould et al. | |
| 5,545,329 A | 8/1996 | La Monica | |
| 5,597,602 A | 1/1997 | Peter et al. | |
| 5,651,877 A | 7/1997 | Gould et al. | |
| 5,703,255 A | 12/1997 | Weete et al. | |
| 5,707,673 A | 1/1998 | Prevost et al. | |
| 5,723,160 A | 3/1998 | Nora et al. | |
| 5,792,358 A | 8/1998 | Parmentier et al. | |
| 5,792,503 A | 8/1998 | Gugger et al. | |
| 5,833,858 A | 11/1998 | Umeda et al. | |
| 5,840,945 A | 11/1998 | Tsujiwaki et al. | |
| 5,843,499 A | 12/1998 | Moreau et al. | |
| 5,880,300 A | 3/1999 | Kodali | |
| 6,140,519 A | 10/2000 | Hutton et al. | |
| 6,207,209 B1 * | 3/2001 | Jirjis et al. | ............ 426/330.6 |
| 6,833,149 B2 * | 12/2004 | Jirjis et al. | ............ 426/330.6 |

FOREIGN PATENT DOCUMENTS

CA          1149290         7/1983
EP      0 095 850 A1      12/1983

(Continued)

OTHER PUBLICATIONS

Subramanian, R. et al. 1997. JAOCS 74(8)971-975.*
Cheryan et al., "Refining Vegetable Oils by Membrane Technology", *Developments in Food Engineering, Proceedings of the 6th International Congress on Engineering and Food*, pp. 677-679.
Cuperus et al., "Applications of Membrane Technology to Food Processing", *Trends in Food Science & Technology*, vol. 4, pp. 277-282 (Sep. 1993).
"Dietary Guidelines Changes Recommended", *Inform*, vol. 6, No. 11, pp. 1213, 1243 (Nov. 1995).
Dutta et al., "Formation and Analysis of Oxidized Sterols in Frying Fat", Chapter 6, pp. 112-150.

(Continued)

*Primary Examiner*—Carolyn Paden
(74) *Attorney, Agent, or Firm*—Merchant & Gould, P.A.

(57) ABSTRACT

A method for processing vegetable oil miscella is provided. The method includes steps of feeding vegetable oil miscella to a conditioned polymeric microfiltration membrane, and recovering a permeate stream having a decreased weight percent of phospholipids compared with the weight percent of phospholipids provided in the miscella. The retentate stream can be further processed for the recovery of lecithin. The polymeric microfiltration membrane can be conditioned for the selective separation of phospholipids in the miscella. A method for conditioning a membrane for selective separation of phospholipids from vegetable oil miscella, and the resulting membrane, are provided. The membrane which can be conditioned can be characterized as having an average pore size of between about 0.1μ and about 2μ.

19 Claims, 2 Drawing Sheets

FOREIGN PATENT DOCUMENTS

| | | |
|---|---|---|
| EP | 182396 | 5/1986 |
| GB | 2084606 | 4/1982 |
| GB | 2092170 A | 8/1982 |
| GB | 2118568 A | 11/1983 |
| JP | 58194996 | 11/1983 |
| JP | 59020394 | 2/1984 |
| JP | 60184596 | 9/1985 |
| JP | 60184597 | 9/1985 |
| JP | 62045592 | 2/1987 |
| JP | 2155989 | 6/1990 |
| JP | 4183795 | 6/1992 |
| WO | WO 83/03620 | 10/1983 |

OTHER PUBLICATIONS

*Inform*, vol. 10, No. 12, pp. 1089-1093 (Dec. 1999).
International Search Report dated May 30, 2000.
Iwama et al., "New Polyimide Ultrafiltration Membranes for Organic Use", *Journal of Membrane Science*, vol. 11, pp. 297-309 (1982).
Iwama et al., Membrane Separation Process for Soybean Oil Refining and Its Economical Effects, *Membrane*, vol. 11, No. 2, pp. 99-108 (1986).
Kochhar, S., "Influence of Processing on Sterols of Edible Vegetable Oils", *Prog. Lipid Res.*, vol. 22, pp. 161-188 (1983).
Koseoglu et al., "Membrane Applications and Research in the Edible Oil Industry: An Assessment", *JAOCS*, 67(4):239-249 (Apr. 1990).
Koseoglu et al., "Membrane Processing of Crude Vegetable Oils: Laboratory-Scale Membrane Degumming, Refining and Bleaching", pp. 182-188.
Koseoglu, S., "Membrane Technology for Edible Oil Refining", *Oils & Fats International*, Issue 5, pp. 16-21 (1991).
Krawczyk, T., "Lecithin: Consider the Possibilities", *Inform*, vol. 7, No. 11, pp. 1159-1175 (Nov. 1996).
Kutowy et al., "Use of Membranes for Oil Upgrading", *Proc. 35th Can. Chem. Eng. Conf.*, vol. 1, pp. 26-30 (1985).
Lin, L. et al., "Bench-scale Membrane Degumming of Crude Vegetable Oil: Process Optimization," *Journal of Membrane Science*, vol. 134, pp. 101-108 (1997).
Ondrey et al., "The Skinny on Oils & Fats", *Chemical Engineering*, pp. 34-38 (Oct. 1997).
Pioch et al., "Towards an Efficient Membrane Based Vegetable Oils Refining", *Industrial Crops and Products Journal*, vol. 7, pp. 83-89 (1998).
Raman et al., "Deacidification of Soybean Oil by Membrane Technology", *JAOCS*, vol. 73, No. 2, pp. 219-224 (1996).
Raman et al., "Membrane Technology", *Oils & Fats International*, vol. 10, No. 6, pp. 28-40 (1994).
Schulte, E., "Determination of Edible Fat Refining by HPLC of Δ 3,5-Steradienes", *Fat Sci. Technol.*, vol. 96, No. 4, pp. 124-128, (1994).
Sen Gupta, "Novel Developments in Refining of Edible Oils", *Fette, Seifen, Anstrichmittel*, vol. 88, No. 3, pp. 79-86 (1986).
Shchipunov et al., "Growth, Branching, and Local Ordering of Lecithin Polymer-Like Micelles", *Langmuir*, vol. 14, No. 22, pp. 6350-6360 (1998).
Shelton, H., "Estimating the Lower Explosive Limits of Waste Vapors", *Environmental Engineering World*, pp. 22-25 (May.-Jun. 1995).
Snape et al., "Processing of Agricultural Fats and Oils Using Membrane Technology", *Journal of Food Engineering*, vol. 30, pp. 1-41 (1996).
Subramanian, R. et al., *JOACS*, vol. 74, No. 8, pp. 971-975 (1997).
Subramanian, R. et al., "Evaluation of Surfactant-Aided Degumming of Vegetable Oils by Membrane Technology", *Journal of the American Oil Chemists' Society*, vol. 76, No. 10, pp. 1247-1253 (1999).
Ziegelitz, R., "Lecithin Processing Possibilities", *Inform*, vol. 6, No. 11, pp. 1224-1230 (Nov. 1995).

\* cited by examiner

METHOD AND APPARATUS FOR PROCESSING VEGETABLE OIL MISCELLA, METHOD FOR CONDITIONING A POLYMERIC MICROFILTRATION MEMBRANE, MEMBRANE, AND LECITHIN PRODUCT

CROSS REFERENCE TO RELATED APPLICATIONS

This application is a continuation of U.S. application Ser. No. 10/202,294 that was filed with the United States Patent and Trademark Office on Jul. 23, 2003 now U.S. Pat. No. 6,833,149. U.S. application Ser. No. 10/202,294 is a continuation-in-part application of U.S. application Ser. No. 09/483,346 that was filed with the United States Patent and Trademark Office on Jan. 14, 2000 now abandoned. U.S. application Ser. No. 09/483,346 is a continuation-in-part application of U.S. application Ser. No. 09/231,692 that was filed with the United States Patent and Trademark Office on Jan. 14, 1999 and issued as U.S. Pat. No. 6,207,209 on Mar. 27, 2001. The entire disclosure of U.S. application Ser. Nos. 10/202,294, 09/231,692, and 09/483,346 are incorporated herein by reference.

FIELD OF THE INVENTION

The invention relates to a method for processing vegetable oil miscella, an apparatus for processing vegetable oil miscella, a method for conditioning a polymeric microfiltration membrane for selective removal of phospholipids from vegetable oil miscella, a membrane for selective removal of phospholipids from vegetable oil miscella, and a lecithin product.

BACKGROUND OF THE INVENTION

Edible vegetable oils are generally obtained by processing oil seeds. Crude vegetable oils can be obtained from vegetable seeds by solvent extraction. Hexane is the most commonly used extraction solvent. The crude vegetable oils generally contain neutral triglycerides and a host of natural contaminants including phosphotides, sulphurous compounds, free fatty acids, carbohydrates, peptides, oxidized lipids, traces of lower aldehydes and ketones, glycosides of sterols and terpenes, and diverse types of color bodies or dyestuffs. These contaminants are removed from the crude vegetable oils in the course of refining in order to render the vegetable oils palatable.

The recovery of soybean oil from soybeans is particularly desirable. A technique for recovering soybean oil includes several processing steps. The soybean is dehulled and crude soybean oil is extracted with hexane. The extractant (miscella), which includes hexane and crude soybean oil, is further processing to recover palatable soybean oil. The hexane is evaporated from the miscella and the resulting crude soybean oil is degummed. Degumming, as used in conventional processes, refers to the removal of phosphatides and other gums from the oil by adding water and/or acid thereto and centrifuging. The recovered oil can be further refined with water and alkaline (such as NaOH) and centrifuged to remove the fatty acids and gums. The oil resulting from the alkaline refining step can then be bleached to remove color bodies, hydrogenated to render the oils more stable, and deodorized. The techniques of degumming, alkaline refining, bleaching, hydrogenating, and deodorizing are well known in the art. It should be appreciated that each separation step, and particularly centrifuging, results in loss of oil. The recovered gum concentrate from the conventional degumming process can be dried, if desired, and bleached to produce a commercial soybean lecithin.

Lecithin is used as an emulsifying agent, a dispersing agent, wetting agent, a penetrating agent, and an anti-oxidant. In addition, lecithin is used in food products, paints, inks, petroleum products, soaps, cosmetics and lubricants. Commercial lecithin is a mixture of phosphatides. Typically, commercially available lecithin includes about 62 wt. % acetone insoluble phosphatides.

Numerous prior art references describe techniques for obtaining vegetable oils by application of membrane technology. For example, U.S. Pat. No. 4,093,540 to Sen Gupta describes refining crude glyceride oils by contacting a composition of glyceride oils and organic solvent under pressure with a semi-permeable ultrafiltration membrane to separate constituents of different molecular weight into retentate and permeate fractions, and contacting the composition or at least one of the fractions with a metal oxide or metalloid oxide adsorbent in a column containing the adsorbent. Additional references which describe the use of membrane technology for separating phospholipids from crude vegetable oils include: U.S. Pat. No. 4,414,157 to Iwama et al.; U.S. Pat. No. 4,533,501 to Sen Gupta; Raman et al., "Membrane Technology", Oils & Fats International, Vol. 10, No. 6, 1994, pages. 28-40; Ziegelitz, "Lecithin Processing Possibilities", Inform, Vol. 6, No. 11, Nov. 1995, pages. 1224-1213; Ondrey et al., "The Skinny On Oils & Fats", Chemical Engineering, Oct. 1997, pages. 34-39; Pioch et al., "Towards An Efficient Membrane Based Vegetable Oils Refining", Industrial Crops & Products, 7 (1998) pages 83-89; Koseoglu et al., "Membrane Applications & Research In The Edible Oil Industry: And Assessment, JAOCS, Vol. 67, No. 4 (April 1990), pages 239-249.

SUMMARY OF THE INVENTION

A method for processing vegetable oil miscella is provided by the present invention. The vegetable oil miscella can be processed into desirable products including vegetable oil and concentrated lecithin.

The method for processing vegetable oil miscella includes a step of feeding vegetable oil miscella to a separation membrane for recovery of a permeate stream and a retentate stream. The separation membrane is provided for removing phospholipids. The recovered permeate stream has a decreased concentration of phospholipids compared with the concentration of phospholipids provided in the miscella. In addition, the retentate stream has an increased concentration of phospholipids compared with the concentration of phospholipids provided in the miscella.

In the context of the present invention, the permeate stream is the stream which flows through the membrane, and the retentate stream is the stream which does not flow through the membrane. The vegetable oil miscella includes extraction solvent and crude vegetable oils containing phospholipids. The vegetable oil miscella can be characterized as raw miscella when it is obtained from refers to as extractant from an extraction process for the recovery of vegetable oils and has not been clarified for the removal of solids. The vegetable oil miscella can be characterized as clarified miscella when it has been treated for the removal of solids.

The separation membrane refers to the membrane which provides for the separation of phospholipids from vegetable oil. The separation membrane can be referred to as the phospholipids separation membrane. In general, the separation membrane can be provided by modifying a membrane having a pore size of between about 0.05µ and about 3µ, and more preferably between about 0.1µ and about 2µ. The modification refers to conditioning which involves treating the membrane with a solvent or solvent system that allows the membrane to be used for separating phospholipids from vegetable oil. The polymeric membrane which is to be conditioned is generally a membrane provided in an aqueous medium. In order to use the membrane with miscella, the membrane can be conditioned.

The vegetable oil miscella preferably contains between about 45 percent by weight and about 90 percent by weight extraction solvent, and more preferably between about 70 percent by weight and about 80 percent by weight extraction solvent. A preferred extraction solvent includes hexane. The permeate stream preferably includes less than 0.6 weight percent phospholipids, more preferably less than about 0.15 weight percent phospholipids, and even more preferably less than about 0.015 weight percent phospholipids.

The vegetable oil miscella which is obtained from an extraction operation generally contains a relatively high level of solids which, if not removed from the miscella, will relatively quickly clog the phospholipids separation membrane. Accordingly, it is desirable to provide a prefilter system for removing the solids in the miscella. The prefilter system can include one or more filters in series to provide reduction of the solids content in the miscella. The resulting miscella having a reduced solids content can be referred to as clarified miscella. In general, the filters used to remove solids from the miscella have an average pore size in the range of about 0.05µ and about 100µ. It is generally advantageous to provide a series of filters having decreasing pore size so that upstream filters remove the relatively large solids and the downstream filters remove the smaller solids. The filters which can be used in the prefilter system need not include conditioned membranes. The filters used in the prefilter system can include stainless steel filters. In addition, the filters can be dead end filters and/or feed and bleed filters. Furthermore, the prefilter system can be practiced batch or continuous. In addition, it will be appreciated that although the filters used for separating phospholipids from vegetable oil are described in the context of continuous operation, they can be used in batch.

The phospholipids separation filter referred to above can be referred to as the first phospholipids separation filter. The retentate stream from the first phospholipids separation filter can be further processed in a second phospholipids separation filter for the separation of phospholipids from vegetable oil. The feed to the second phospholipids separation filter preferably includes a combination of the retentate stream from the first phospholipids separation filter and additional solvent. It is generally desirable to provide the additional solvent to help drive vegetable oil through the membrane provided in the second phospholipids separation filter. The resulting retentate stream can be processed into a lecithin product containing between about 50 wt. % and about 85 wt. % phospholipids. Preferably, the lecithin product includes between about 72 wt. % and about 85 wt. % phospholipids. In addition, the permeate stream from the second phospholipids separation filter can be recycled by combining it with the clarified miscella.

The permeate stream from the first phospholipids separation filter can be fed to a third phospholipids separation filter for the separation of phospholipids from vegetable oil. Although the permeate stream from the first phospholipids separation filter may be a commercially acceptable vegetable oil product, it may be desirable to further remove phospholipids. Accordingly, the permeate stream from the third phospholipids separation filter can provide vegetable oil having a phospholipids content of less than 7 ppm. In addition, the retentate stream from the third phospholipids separation filter can be recycled by combining it with the clarified miscella.

An apparatus for processing vegetable oil miscella is provided by the invention. The apparatus includes at least the first phospholipids separation filter, including the separation membrane. The apparatus can additionally include any of the second phospholipids separation filter, the third phospholipids separation filter, and the prefilter system, and any of the conduits or lines connecting these various components.

A method for conditioning a membrane is provided by the invention. The method includes providing a polymeric microfiltration membrane characterized as having an average pore size in the range of about 0.05µ to about 3µ, and more preferably in the range of about 0.1µ and about 2µ, and more preferably between about 0.2µ and about 0.5µ. Preferably, the polymeric microfiltration membrane comprises polyacrylonitrile, polysulfone, polyamide, or polyimide. The polymeric microfiltration membrane can be conditioned by treating the membrane with an intermediate solvent, and then treating the membrane with an extraction solvent. A preferred embodiment of the invention includes treating the membrane with a mixture of intermediate solvent and extraction solvent between the steps of treating the membrane with an intermediate solvent and treating the membrane with raw miscella. The conditioned polymeric membrane can be used as the separation membrane in any of the first, second, and third phospholipids separation filters. In addition, the conditioned membrane can be used in the prefilter system, if desired. Preferably, the conditioned membrane used in the third phospholipids separation filter is tighter than the conditioned filter used in the first phospholipids separation filter.

Another technique for conditioning the membrane includes treating the membrane with raw miscella. In general, this technique can include a first step of treating the membrane with the solvent provided in the raw miscella, and then treating the membrane with the raw miscella. The steps of treating generally include treating for at least about 10 minutes, and more preferably at least about 20 minutes. In most situations, it is believed that the treating can occur for about one hour. Although longer treating times can be provided, it should be understood that longer treating times result in a down-time or delay in the separation operation.

The steps of treating the membrane with solvent are conducted for a period of time which is sufficient to provide the desired level of conditioning. In most cases, it is expected that the treatment will include flushing and/or soaking for at least about one-half hour. For convenience, it may be desirable to allow the membrane to soak in the particular solvent over night or for a period of up to about 24 hours. It should be understood that longer soaking times are permitted.

The treatment with the intermediate solvent is advantageous to reduce the likelihood of shocking or harming the membrane when treated with the extraction solvent or the miscella. Exemplary intermediate solvents include alcohols and acetone. Preferably, the intermediate solvent is one which is miscible with the extraction solvent. In the case of using hexane as the extraction solvent, the intermediate solvent is preferably ethanol, propanol or a mixture of ethanol and propanol.

A conditioned polymeric microfiltration membrane is provided by the invention. The conditioned membrane can be characterized as a membrane resulting from the steps of conditioning. In addition, the conditioned membrane can be characterized in terms of its performance. For example, a soybean oil miscella can be providing containing 25 percent by weight crude soybean oil and 75 percent by weight hexane, and containing a phosphorous level of about 5,000 ppm in the crude oil. By feeding the miscella to the membrane at a transmembrane pressure of about 150 psi, it is expected that the membrane will provide a steady state permeate at a flux of greater than about 65 l/hr m$^2$ and a phosphorous level of less than about 50 ppm. Preferably, the phosphorous level will be less than about 25 ppm. More preferably, the flux will be greater than about 80 l/hr m$^2$.

A lecithin product composition is provided according to the invention. The lecithin product can be prepared by processing through the phospholipids separation filter according to the invention, and includes a phospholipids concentration of between about 50 wt. % and about 85 wt. % after volatilization to remove solvent. Preferably, the lecithin has a phospholipids concentration of between about 72 wt. % and about 85 wt. %, and more preferably between about 75 wt. % and about 85 wt. %.

DETAILED DESCRIPTION OF THE PREFERRED EMBODIMENT

Figure 2:
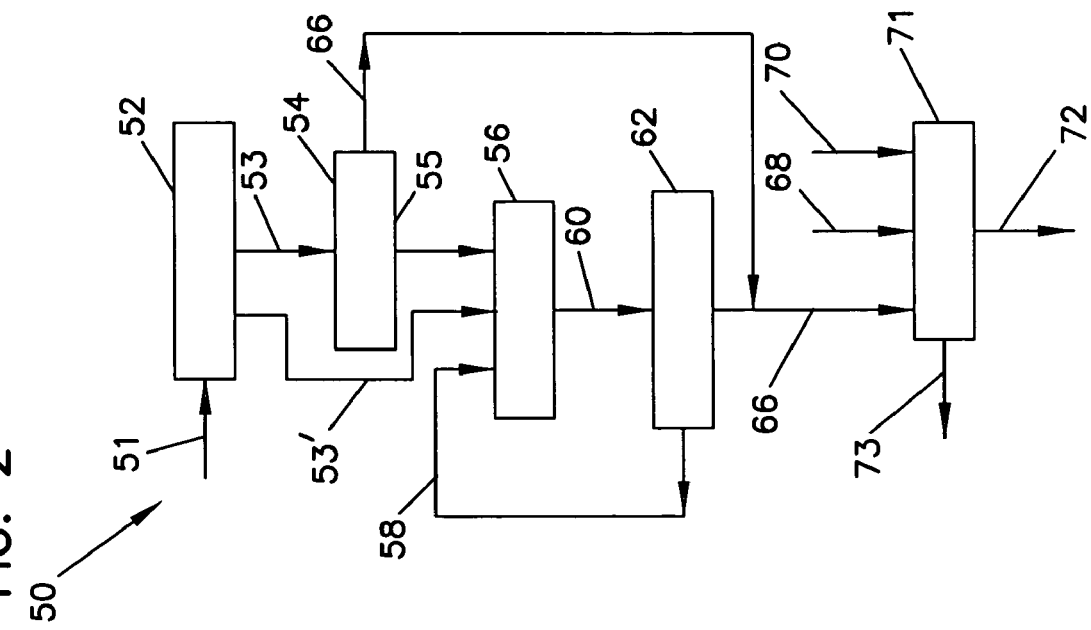
FIG. 2 is a diagrammatic representation of a prior art method for removing phospholipids from vegetable oil miscella utilizing acid and alkaline treatment.

The invention relates to a method for processing vegetable oil miscella. Vegetable oil miscella can be referred to herein more simply as miscella. Miscella refers to the extractant resulting from solvent extraction of vegetable seeds. The miscella generally includes vegetable oil solvent and crude vegetable oil obtained by extraction from the vegetable seeds. Techniques for solvent extraction of vegetable seeds are well known and are described, for example, in *Bailey's Industrial Oil and Fat Products*, 5$^{th}$ Edition, edited by Y. H. Hui, New York, Wiley, 1996, and *Handbook of Soy Oil Processing and Utilization*, St. Louis, Mo., American Soybean Association, Champaign, Ill., American Oil Chemists' Society, the disclosures of which are incorporated herein by reference.

Vegetable oil miscella can be processed to recover several valuable products. Vegetable oil is clearly one type of product having a desired commercial value. Another product having commercial value and which can be obtained from vegetable oil miscella includes lecithin. As described in more detail below, the method for processing vegetable oil miscella can be modified according to the invention depending upon the product desired to be recovered and its desired purity.

The preferred vegetable oils which can be processed and/or isolated according to the present invention are the edible vegetable oils which are well-known in the vegetable oil industry. Exemplary vegetable oils include soya bean oil, corn oil, ground nut oil, olive oil, linseed oil, rapeseed oil, sunflower seed oil, safflower seed oil, cottonseed oil, and grape seed oil. Preferred oils which can be recovered according to the invention include soya bean oil, rapeseed oil, ground nut oil, corn oil, sunflower oil, cottonseed oil, and linseed oil.

Vegetable oil miscella which is obtained directly from an extraction operation without treatment to remove solids can be referred to as raw miscella. Raw miscella generally includes extraction solvent, crude vegetable oil, and solids. Crude vegetable oil generally includes vegetable oil and phospholipids at a level which renders the oil unpalatable. The raw miscella may or may not include solids, but it is expected that raw miscella will generally include solids. The solids can be referred to herein as fines and can be characterized as particulates. One source of particulates includes meal fines obtained from seed hulls, dirt, sand, grit, etc. The solids are generally considered contaminants and it is desirable to remove the solids prior to separating the phospholipids from the vegetable oil. In fact, the extractant from an extraction operation often includes hydroclones for the removal of solids. Nevertheless, the resulting raw miscella typically includes solids which need to be removed prior to filtration for the removal of phospholipids. A preferred technique for removing fines from raw vegetable oil miscella includes filtration, and the step of removing solids from raw miscella can be referred to as pre-filtration. The filtration can be batch or continuous, and can include several stages. It is desirable for the filtration to remove solids and allow the crude vegetable oil to pass through the filter.

In order to recover edible vegetable oils from the miscella, phospholipids are removed. The technique for removing phospholipids from miscella can be referred to as miscella degumming. Additional impurities, such as, color bodies and free fatty acids, provided in the miscella can be removed by the technique of removing phospholipids from vegetable oil miscella according to the invention.

The solvent provided in the vegetable oil miscella is usually the extraction solvent. The extraction solvent can refer to the solvent which solubilizes the crude vegetable oil during the extraction operation. In addition, the extraction solvent can refer to any solvent which solubilizes the crude vegetable oil. A solvent which solubilizes the vegetable oil can be referred to herein as the vegetable oil solvent, and may or may not be the actual solvent used during the extraction operation. Although the solvent in the raw miscella can be replaced with another solvent for the degumming process, it is convenient to practice the degumming process with the solvent used in the extraction operation. The solvent which can be used for extracting crude vegetable oils from crushed vegetable seeds is one in which the vegetable oils readily solubilize. Such solvents are well-known in the industry. The solvent is preferably one having a comparatively low molecular weight. That is, a molecular weight which is not substantially more than that of the vegetable oil. Preferably, the molecular weight of the solvent is between about 50 and about 200, and more preferably between about 60 and about 150. Preferred solvents include inert hydrocarbons, particularly alkanes, alcohols, cycloalkenes, and simple aromatic hydrocarbons, e.g., benzene and its homologues containing alkyl substituents having up to four carbon atoms. The alkane and alcohol solvents are preferably straight chain or branched. Preferred alkanes and alcohols include hexane, such as, n-hexane and isohexane, ethanol, n-propyl alcohol, isopropyl alcohol, and mixtures thereof. These solvents tend to improve the mobility of the oil and bringing about a transformation of phospholipid molecules present to form micelles. This phenomena, which can be described as aggregation of a large number of phospholipid molecules under the influence of the solvent to bodies (micelles) of high molecular weight which can be as high as 200,000 in hexane, greatly increases the effective size of the phospholipids. Moreover, the micelles thus formed appear to imbed the comparatively small molecules of other impurities such as sugars and amino acids which might otherwise escape with the oil through the membrane. Exemplary hydrocarbons include benzene, toluene, xylenes, cycloalkanes such as, cyclohexane, cyclopentane, and cyclopropane, and alkanes, such as pentanes, hexanes, butanes and octanes in mixtures thereof, petroleum ether boiling between the range of −1° C. and 120° C. or alkenes.

While it is preferred to use hydrocarbons which are normally liquid at ambient temperatures, other solvents may be used including those solvents which are liquid only under the filtration pressure used. Where the oil is to be separated by evaporating off the solvent, the solvent preferably has a comparatively low boiling point. Where phosphatides are not present in significant amounts, other organic solvents including acetone may be used.

The amount of solvent in the miscella is generally provided as a result of extracting crude vegetable oils from vegetable seeds. Accordingly, the amount of solvent present in the miscella may vary depending upon the particular solvent extraction design utilized. While an amount of solvent can be removed from the miscella prior to degumming the miscella, it is preferred that a sufficient amount of solvent remains which provides separation of the miscella by flow through a separation membrane. In general, it is expected that the miscella will include an amount of solvent of between about 45 percent by weight and about 90 wt. %, more preferably between 50 wt. % and 85 wt. %, and even more preferably between about 70 wt. % and about 80 wt. %.

Removing Phospholipids

Figure 1:
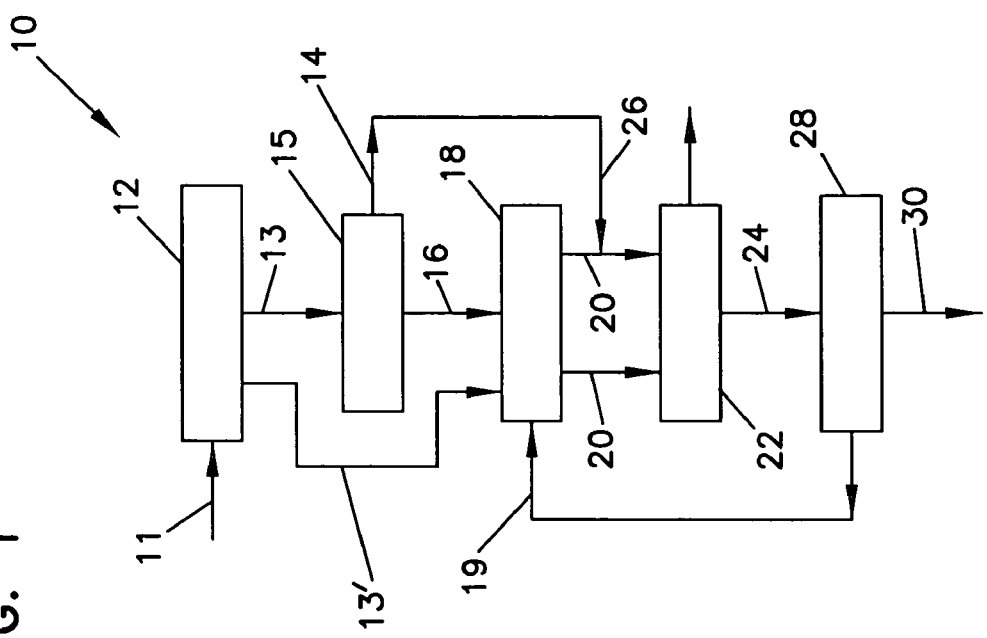
FIG. 1 is a diagrammatic representation of a method for removing phospholipids from vegetable oil miscella according to the principles of the present invention.

Now referring to FIG. 1, a method for removing phospholipids from vegetable oil miscella according to the invention is provided at reference numeral 10. Oil seeds are prepared for extraction using techniques well known in the art. Oil seeds 11 are processed in a preparation unit 12. This generally includes dehulling and/or grinding the oil seeds. Crude vegetable oil 14 can be obtained from certain types of vegetable oils by expelling in an expeller unit 15. Accordingly, the ground oil seeds 13 can be fed to an expeller 15 to provide crude vegetable oil 14. It should be understood that crude vegetable oil is generally not obtained from all types of oil seeds by expelling. Accordingly, the ground oil seeds 13' can be sent directly to an extractor 18, bypassing the expeller 15. In addition, expelled cake 16 can be processed for the recovery of crude vegetable oil by extraction.

A solvent 19 is introduced into the extractor 18 and miscella 20 is recovered. The miscella 20 includes, as major constituents, extraction solvent, vegetable oils, and phospholipids. Techniques for forming miscella by solvent extraction of vegetable oil seeds are generally known in the art. If desired, the expelled crude oil 14 can be combined with the miscella 20 for further processing.

The phospholipids can be removed from the miscella 20 by feeding the miscella 20 to a filter 22 which includes a separation membrane. The separation membrane is preferably a polymeric microfiltration membrane which has been conditioned to selectively remove phospholipids from the miscella 20. Details of the separation membrane and techniques for conditioning the membrane for selective removal of phospholipids are described below.

The separation membrane can be provided in any form which can provide the desired degree of miscella degumming. In general, membranes are available as spiral wound membranes, tubular membranes, and flat plate membranes. For the removal of phospholipids from miscella, spiral wound membranes are preferred because they are generally more cost effective than other filter designs. Membranes are typically provided on a backing for support.

A permeate stream 24 flows from the filter 22 and includes vegetable oils and extraction solvent having a decreased concentration of phospholipids relative to the miscella 20. The retentate stream 26 flows from the filter 22 and includes vegetable oils and extraction solvent and an increased concentration of phospholipids relative to the miscella 20. The filtration system can be a batch or continuous. A preferred type of continuous filtration system includes a feed and bleed system. In a feed and bleed system, the miscella circulates through conduits provided in the filtration system in a loop, and miscella is fed into the system at a particular feed rate and permeate and retentate are bled from the system at a particular rate.

The permeate stream 24 is fed to an evaporator 28 for removal of the extraction solvent. The resulting vegetable oil stream 30 can be treated by steps of refining, bleaching, hydrogenating, and deodorizing which are generally known in the art. Such techniques are described, for example, in the *Handbook of Soy Oil Processing and Utilization*, St. Louis, Mo., American Soybean Association, Champaign, Ill., American Oil Chemists' Society.

The method of the invention can be used to provide a resulting vegetable oil stream 30 containing a desired level of phospholipids. Typically, commercially degummed vegetable oil has a phospholipids level of less than 100 ppm. In general, lower levels of phospholipids in vegetable oil are desirable. The method of the invention can provide a vegetable oil stream having a phospholipids level of less than 30 ppm, and more preferably less than 5 ppm.

Now referring to FIG. 2, a prior art method for removing phospholipids form vegetable oil miscella is shown at reference numeral 50. This prior art process is shown to provide a comparison with the process of the invention. In general, oil seeds 51 are processed in a preparation unit 52, and, if desired, the ground seeds 53 are subject to expelling in an expeller 54. The ground seeds 53' and/or the expelled cake 55 is fed to an extractor 56, along with an extraction solvent 58, and miscella 60 is recovered. The solvent 58 is recovered from the miscella in an evaporator 62. The resulting crude oil 66 (which can also be obtained from the expeller 54 for certain types of oil seeds) is subjected to water 68 and acid 70 treatment in order to hydrate the phospholipids. The water and acid treated crude oil is processed in a centrifuge 71 to remove the hydrated gums 73. The resulting degummed stream 72 is generally treated with aqueous alkaline for neutralization and further centrifuging. The resulting oil is then typically bleached, hydrogenated, and deodorized.

Processing Vegetable Oil Miscella

Figure 3:
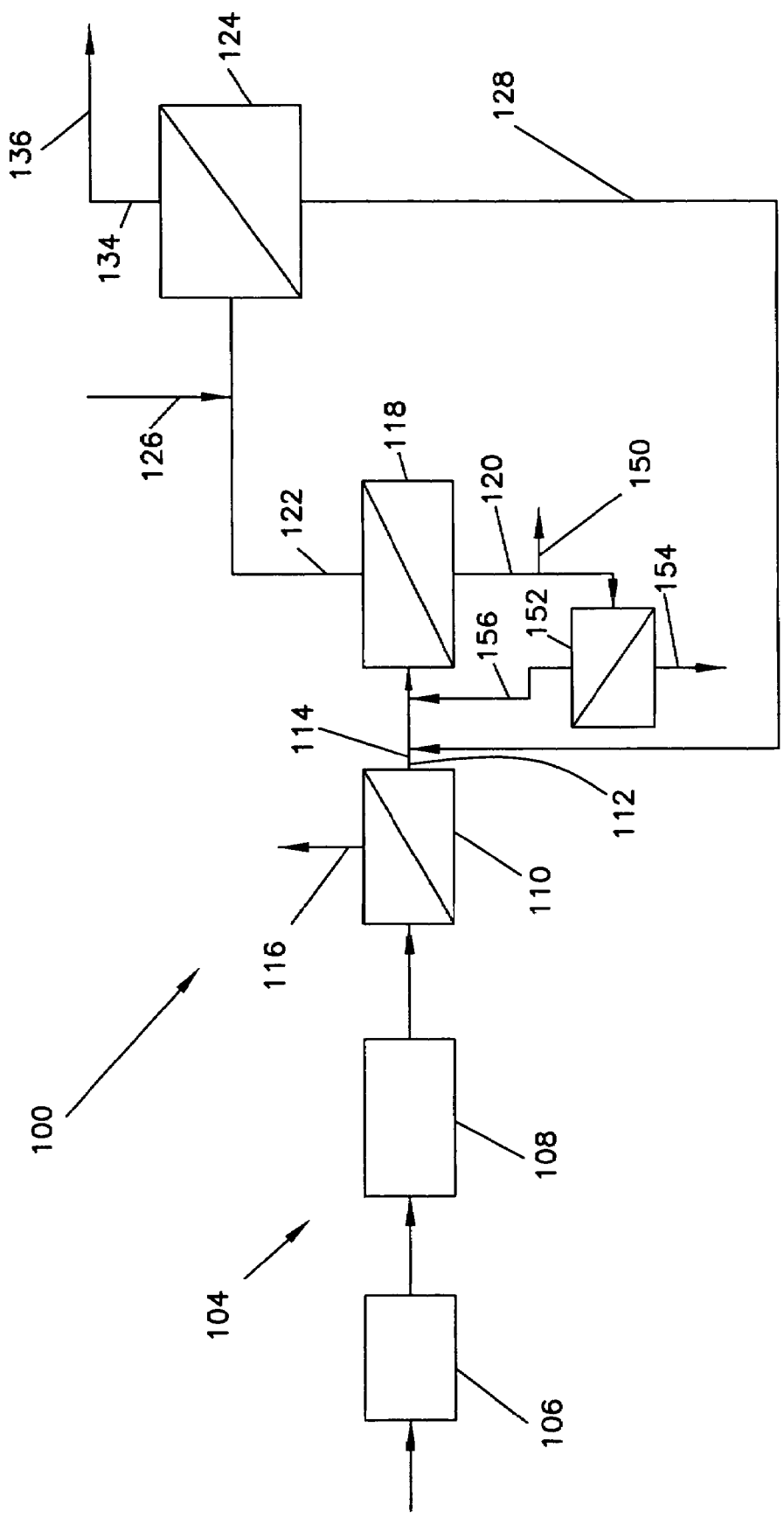
FIG. 3 is a diagrammatic representation of a method for processing vegetable oil miscella.

Now referring to FIG. 3, a method for processing vegetable oil miscella is provided at reference numeral 100.

Raw miscella 102 can be fed to a prefilter system 104 for removal of fines. The fines can include portions of meal, seed hulls, sand, dirt, grit, etc. It is desirable for the prefilter system to remove fines but allow vegetable oil and phospholipids to pass through. The prefilter system 104 can include a series of filters 106, 108 and 110. The prefilter system 104 provides miscella 112 having a solids content of less than about 10 ppm. The miscella 112 can be referred to as clarified miscella 114 because it has been treated for the removal of fines. Preferably, the clarified miscella 114 has an almost negligible solids content. Accordingly, the prefilter system 104 processes the raw miscella 102 to clarified miscella 114. Of course, the clarified miscella 114 can include a solids content of greater than 10 ppm, but it is expected that the solids will cause premature clogging of the downstream phospholipids separation filter, which, in turn, would require more frequent cleaning.

The raw miscella can be obtained directly from an extractor. Typically, the raw miscella 102 will include a solids content which, if directed to the phospholipids removal filter according to the invention, would fairly quickly clog the phospholipids removal filter. In general, raw miscella typically contains a solids content of up to about 0.5 wt. % although this amount can certainly be higher depending on the extraction operation. It should be understood that the steps of crude oil preparation and extraction can provide crude miscella having a variety of solids contents, and the prefilter system is provided for reducing the solids content to avoid fouling of the separation membrane. For many extraction operations, the solids content of the raw miscella is between about 0.1 wt. % and about 0.2 wt. %. The size of the solids which should be removed from the raw miscella are typically provided in a distribution between about 0.1μ and about 100μ.

The prefilter system is preferably provided as a series of filters having decreasing pore size. An upstream filter will generally have a larger pore size to remove the relatively larger solids, and the downstream filter will have a generally smaller pore size to remove smaller solids. The actual pore size of each filter depends on the solids content of the raw miscella. Of course, the prefilter system can be provided as a single filter. The filters provided in the prefilter system preferably have an average pore size in the range of about 0.05μ and about 100μ. As shown in FIG. 3, the prefilter system 104 includes three filters 106, 108 and 110. Filter 106 preferably includes pore sizes of between about 30μ and about 100μ, filter 108 preferably includes pore sizes of between about 1μ and about 40μ, and filter 110 preferably includes pore sizes of between about 0.05μ and about 1μ. The filter 106 and 108 are preferably stainless steel and can be provided having average pore sizes of about 40μ and about 20μ, respectively. In the case where filter 110 is a polymeric membrane, it preferably has an average pore size of between about 0.1μ and about 1μ, and more preferably between about 0.2μ and about 1μ. In the case where the filter 110 is a ceramic filter, it is believed that the average pore size can be as low as about 0.05μ. In addition, it may be desirable to use a precoat filter as the filter 110. The precoat filter can be prepared by providing a depth material on a filter surface. The depth material can be provided by depositing deep bed filtering agents and/or clarifying agents on a filter surface. The depth material can be prepared by mixing deep be filtering agents and/or clarifying agents with miscella. Exemplary deep bed filtering agents and/or clarifying agents include soy flour, soy meal, diatomaceous earth, etc.

The filters 106 and 108 are shown as dead end filter, and the filter 110 is shown as a feed and bleed filter. It should be understood that the filters provided in the prefilter system can all include dead end filters, feed and bleed filters, or mixtures thereof. In addition, the filters can be operated in batch or continuously. The filter 110 provides a retentate stream 116 which can be fed back to the extractor.

The clarified miscella 114 is fed to a first phospholipids separation filter 118 for the separation of phospholipids from the vegetable oil. The first phospholipids separation filter 118 can take the form of the filter 22 shown in FIG. 1. The permeate stream 120 includes a decreased concentration of phospholipids relative to the concentration of phospholipids in the clarified miscella 114. The permeate stream 120 can be characterized as a vegetable oil product 150 and recovered and process to provide a commercial product. The retentate stream 122 includes an increased concentration of phospholipids relative to the concentration of phospholipids in the clarified miscella 114. The retentate stream 122 can be further processed according to the invention.

The retentate stream 122 can be provided as a feed stream 132 and fed to a second phospholipids separation filter 124. Solvent 126 is preferably added to the retentate stream 122 to provide the feed stream 132 which helps drive vegetable oil through the second phospholipids separation filter 124 and into the permeate stream 128. The permeate stream 128 can then be recycled to the clarified miscella 114. The retentate stream 134 includes an increased concentration of phospholipids relative to the feed stream 132 and can be made available as a lecithin product.

The permeate stream 120 can be referred to as degummed vegetable oil miscella 150. The degummed vegetable oil miscella 150 preferably includes a phospholipids content of less than about 200 ppm, and can be processed by conventional techniques of refining, bleaching, hydrogenating, and deodorizing. In addition, the degummed vegetable oil miscella 150 can be subjected to a further separation in a third phospholipids separation filter 152 for the recovery of a permeate stream 154 and a retentate stream 156. The permeate stream 154 preferably includes less than 7 ppm phospholipids, and more preferably less than 5 ppm phospholipids. The permeate stream 154 can be referred to as degummed vegetable oil miscella 160 and can be further processed by physical refining, such as, bleaching and deodorizing. Accordingly, the filter 152 may be used to avoid chemical processing techniques. The retentate stream 156 can be recycled to the clarified miscella 114. In general, it is expected that the membrane used in the filter 152 provides a tighter pore size than the membrane used in the first phospholipid separation filter 118. Preferably, the filter 152 includes a modified membrane wherein prior to modification as described herein, the membrane has an average pore size of between about 0.1 and 0.5μ.

The vegetable oil miscella stream 102 has a range of components which depends upon the type of oil seed processed in the extractor, the conditions of the extraction, and the level of recycle introduced into the vegetable oil miscella. In general, the vegetable oil miscella 102 includes a concentration of vegetable oil of between about 15 wt. % and about 50 wt. %, a concentration of phospholipids of between about 1 wt. % and about 4 wt. %, and a concentration of solvent of between about 50 wt. % and about 85 wt. %. Preferably, the raw miscella includes between about 20 wt. % and about 40 wt. % vegetable oil and between about 60 wt. % and 80 wt. % solvent, and, more preferably, between about 25 wt. % and about 35 wt. % phospholipids and between about 65 wt. % and about 75 wt. % solvent.

The permeate stream 120 is preferably provided with a level of phospholipids which is acceptable for providing commercial vegetable oil product. A commercial vegetable oil product preferably has less than 100 ppm phospholipids. It should be understood that the permeate stream 120 can be further processed by bleaching, hydrogenating, and/or deodorizing. The permeate stream 120 preferably includes about the same wt. % of vegetable oil and solvent as the miscella fed to the filter 118. The solvent is typically vaporized from the vegetable oil product to provide the vegetable oil product 150, and the vegetable oil product can be provided with less than about 100 ppm phospholipids.

The first phospholipids separation filter 118 is probably run at a concentration which provides a desired level of separation. If too much is taken off as permeate 120 relative to retentate 122, it is expected that the phospholipids level in the permeate 120 will be too high. In addition, it is desirable to provide as much permeate 120 as possible while retaining the desired level of phospholipids. The first phospholipids separation filter 118 is preferably run at a concentration of between about 6× and about 15× to provide a desired level of separation. Preferably, the first phospholipids separation filter is run at a concentration of about 7×. A concentration of 7×means that 7 parts by weight are going to the permeate stream and 3 parts by weight are going to the retentate stream.

The retentate stream 122 can be characterized as having a concentration of phospholipids of between about 5,000 ppm and about 12,000 ppm. The retentate stream 122 generally includes levels of vegetable oil and solvent similar to the levels provided in the miscella.

The second phospholipids separation filter 124 is preferably run at a concentration of between about 6× and about 15×, and at a solvent stream 126 to retentate stream 122 flow rate of between about 5:1 to about 1:1. If too much solvent is added, the burden on the downstream distillation capacity is too much. However, the amount of solvent can be increased if the downstream distillation capacity can handle the additional solvent. In general, it is desirable to provide the solvent stream 126 to enhance the separation of vegetable oil from the lecithin.

The feed stream 132 preferably includes between about 90 wt. % and about 99.5 wt. % solvent and between about 0.5 wt. % and about 10 wt. % of the combination of vegetable oil and phospholipids. Preferably, the feed stream 132 includes between about 95 wt. % and about 99 wt. % solvent and between about 1 wt. % and about 5 wt. % the combination of oil and phospholipids. The retentate stream 132 contains between about 2 wt. % and about 25 wt. % of the combination of oil and phospholipids, and the permeate stream contains between about 0.1 wt. % and about 5 wt. % of the combination of oil and phospholipids. The retentate stream 134 can be processed into a lecithin product 136 by devolatilizing the solvent. In general, the lecithin product 136 will include between about 50 wt. % and 85 wt. % phospholipids and the balance being vegetable oils and impurities including free fatty acids. Preferably, the lecithin product includes between about 70 wt. % and about 85 wt. % phospholipids, and more preferably between about 72 wt. % and about 85 wt. % phospholipids. Even more preferably, the lecithin product will have a phospholipids concentration of between about 75 wt. % and about 85 wt. %. It is believed that the lecithin product obtained by processing according to the invention is new because prior art lecithin products generally require removal of hydratable and/or non-hydratable phospholipids and the removal of free fatty acid. Accordingly, it is believed that prior art processing techniques for the production of lecithin result in a product which is different from the lecithin product prepared according to the invention.

The lecithin product according to the invention can be used in any application where commercially available lecithin has been used. In addition, the lecithin product according to the invention can be used in applications where its use is desirable. The lecithin product according to this invention can be used as an emulsifier, surfactant, stabilizer, releasing agent, wetting agent, dispersing agent, lubricant, viscosity control agent, crystallization agent, softening agent, emollient, anti-dusting agent, and high nutritional ingredient. Various applications in which the lecithin product according to the invention can be used include food applications, feed applications, technical applications, cosmetic applications, and pharmaceutical/neutraceutical applications. Exemplary food applications include chocolate, chocolate derivatives, bakery, confectionary, icings, dairy products, cheese products, pasta products, margarine, shortening, fat mixtures, emulsions, spray oils, dressings, instantizing of cacao, milk, non dairy protein powders, release agents, soups, sauces, mayonnaises, dressings, meats, gravies, canned meats, meat analogues, bread improvers, beverages, energy drinks, snacks, desserts (such as, ice cream and bars), meal improvers, bread improvers, chewing gum, colors, flavor mixes, emulsifier mixes, baby food, and antioxidants. Exemplary feed applications include emulsifiers and sources of high nutritional value in feed for, for example, fish, shrimp, calves (as milk replacer), pigs, sows, piglets, pets, mink, and poultry. Exemplary technical applications includes as a dispersing agent in, for example, paints, inks, coatings, magnetic tapes, and discs, as a softening agent in, for example, leather and textiles, as an emulsifier in, for example, crop protection and agrochemicals, as lubricants, oils, adhesives, adsorbents, flocculants, corrosion inhibitors, ceramics, glass, detergents, metal processing, paper, petroleum products, photocopying, photography, polymers, rubbers, and textiles. Exemplary cosmetical applications include as a dispersing agent in lipstick and nail polish, and as an emulsifier/stabilizer in shampoos, creams, and lotions. Exemplary pharmaceutical/neutraceutical applications include as a natural source of phospholipids. Exemplary phospholipids include phosphatidyl choline and vitamin E.

The lecithin product according to the invention can be used as a starting material for derived processes and products, such as, deoiled lecithin, phospholipids fractions, enzymatical modifications, chemical modifications, and compounded products. Exemplary chemical modifications include hydroxylation, acetylation, interesterification, and hydrogenation. Exemplary compounded products include use on a carrier and with emulsifiers.

The permeate stream 128 can be recycled. In general, the permeate stream 126 contains too much phospholipids for it to be recovered and made available commercially as a vegetable oil product. In general, the permeate stream 126 will include a phospholipids level in excess of about 200 ppm. The permeate stream 128 can be recycled to the clarified miscella 114.

Membrane Conditioning

The invention relates to the conditioning of a polymeric membrane for the selective removal of phospholipids from vegetable oil miscella. The conditioned polymeric membrane can be referred to herein as the conditioned membrane, and may be useful in the filters 118, 124, and 152. In addition, the conditioned membrane can be used as a prefilter.

Membranes generally act as filters for preventing the flow therethrough of particular sized components. The membranes can be characterized in terms of their average pore size. For example, membranes having an average pore size of between about $0.1\mu$ and about $2\mu$ are referred to as microfilters or microfiltration membranes; membranes having an average pore size of between about 10,000 mwco (molecular weight cut-off using Dextran) and about $0.1\mu$ are referred to as ultrafilters or ultrafiltration membranes; membranes having an average pore size of between about 200 mwco and about 10,000 mwco are referred to as nanofilters; and membranes that can remove components of below 200 mwco are referred to as reverse osmosis membranes.

Applicants discovered that by conditioning a membrane having a pore size of between about $0.05\mu$ and about $3\mu$, more preferably, between about 0.1% and about $2\mu$, and even more preferably between about $0.3\mu$ and about $0.5\mu$, the conditioned membrane can be provided for selectively removing phospholipids from miscella. Furthermore, the flux across the membrane is increased at a given transmembrane pressure compared with the use of an ultrafiltration membrane for removal of phospholipids from miscella. In addition, the use of a conditioned microfiltration membrane can provide a lower transmembrane pressure at a given flux across the membrane compared with the use of an ultrafiltration membrane.

The membrane is preferably conditioned by successive solvent treatments. In general, commercially available polymeric microfiltration membranes are delivered from the manufacturer soaking in water or glycerol. The successive treatment of the membrane is provided for conditioning the membrane so it will function in the miscella for selectively removing phospholipids. That is, the membrane should be conditioned so that it will not react adversely when contacted with the extraction solvent provided in the miscella. In cases where the membrane would be shocked by placement directly in the extraction solvent for conditioning, an intermediate solvent can be used to provide a first level of conditioning before the membrane is introduced into the extraction solvent.

The treatment of the membrane is provided for gradually changing the polarity of the membrane. The treatment can involve flushing with a solvent, soaking in a solvent, or a combination thereof. Furthermore, the treatment can include successive treatment with different solvents or blends of solvents to provide the modified membrane.

In a preferred method for conditioning a polymeric microfiltration membrane, the membrane is preferably first soaked in an intermediate solvent, such as an alcohol. Preferred alcohols which can be used as the intermediate solvent include ethanol, propanol, isopropanol, butanol, octanol, and mixtures thereof. Preferred alcohols are those which are miscible with the extraction solvent. In the case where hexane is the extraction solvent, a preferred intermediate solvent includes ethanol, propanol, and a mixture of ethanol and propanol. A non-alcohol intermediate solvent includes acetone.

Prior to the soaking, the membrane can be flushed with intermediate solvent to remove water or glycerol or other solvent in which the membrane is provided. The membrane is then preferably soaked in a mixture of intermediate solvent and extraction solvent. When hexane is the extraction solvent, the mixture preferably includes about 50 percent by weight ethanol and about 50 percent by weight hexane. An additional intermediate solvent mixture includes a mixture of isopropyl alcohol and hexane such as a mixture of about 50% by weight isopropyl alcohol and about 50% by weight hexane. The membrane is then flushed with the extraction solvent to remove the intermediate solvent. The membrane can then be used according to the invention. It should be appreciate that while a preferred embodiment of the invention is described in the context providing at least three separate treatment steps, the invention can be practiced by treating the membrane in an intermediate solvent and then treating the membrane in the extraction solvent. Furthermore, it should be understood that the extraction solvent refers to the solvent provided in the miscella. Thus, the extraction solvent in the miscella can contribute to the treatment of the membrane.

It should be appreciated that the length of treatment of the membrane in a particular solvent should be sufficient to provide the desired level of conditioning in that step. For example, it is expected that the step of treating the membrane in an intermediate solvent can be provided in 10 minutes. It is convenient, however, to allow the membrane to soak for at least one-half hour, and more preferably about 5 hours to about 24 hours. It is expected that the step of treating the membrane in a mixture of intermediate solvent and extraction solvent can be provided in 10 minutes, but is conveniently provided for up to about 5 hours or 24 hours. Furthermore, it is expected that the step of treating the membrane in the extraction solvent is can be provided to remove intermediate solvent. It is expected that flushing the membrane with extraction solvent to remove intermediate solvent will take place in about 10 minutes. However, it is convenient to allow the membrane to soak in extraction solvent for about 5 hour or up to about 24 hours.

After the membrane has been used according to the invention, it can be cleaned and regenerated by treating with extraction solvent. In general, it is expected that the membrane can be used for removing phospholipids from miscella in a continuous filtration operation for at least about 24 hours before cleaning the membrane in the extraction solvent for a period of time generally less than one-half hour. The membrane can be cleaned by flushing with extraction solvent for an amount of time sufficient to remove phospholipids from the membrane. It is expected that the membrane can be cleaned by flushing in extraction solvent for about 10 minutes. Furthermore, the cleaning time in the extraction solvent can be provided for greater than one-half hours. In addition, it should be appreciated that rather than using pure extraction solvent to flush the membrane for cleaning, it is expected that fresh miscella which has not been concentrated can be used for cleaning the membrane. In general, miscella obtained directly from an extractor can be referred to as unconcentrated miscella. Furthermore, it is expected that an acid can be added to the extraction solvent or unconcentrated miscella in order to assist the cleaning. For example, citric acid, phosphoric acid, lactic acid, or sulfuric acid can be added to extraction solvent in an amount of about 0.1 or about 0.2 percent by weight to provide assistance in cleaning.

Membranes which can be used according to the invention include a $0.3\mu$ polyacrylonitrile (PAN) membrane available from Osmonics, Inc. of Minnetonka, Minn., and a $0.1\mu$ polysulfone (PS) membrane which is available from Hoechst Separation Product of Wiesbaden, Germany. Other polymeric microfiltration membranes such as polyamide (PA) and polyimide (PI) can also be used according to the invention.

A preferred extraction solvent which can be used for conditioning the membrane includes hexane. It should be appreciated that the reference to hexane includes the isomers of hexane such as isohexane and n-hexane and mixtures thereof. In addition, the extraction solvent can include isopropanol.

The membrane can be conditioned by treatment with the miscella solvent, followed by treatment with raw miscella. When hexane is used as the miscella solvent, the membrane can be treated with hexane and then treated with raw miscella. The treatment of the membrane with hexane should be provided for at least about 10 minutes, and the treatment with raw miscella should be provided for at least about 10 minutes and more preferably at least about 20 minutes. Without being bound by theory, it is believed that the raw miscella may function to foul the membrane sufficiently to help control the rejection of phospholipids when the conditioned membrane is used for selective separation of phospholipids. In addition, the steps of treating the membrane preferably include providing the solvent or the raw miscella in a closed loop for up to one to two hours. By providing a closed loop, the material continues to circulate through the membrane.

The conditioned membrane of the invention can be characterized in terms of its performance. For example, a soybean oil miscella feed characterized by 25 percent by weight crude soybean oil and 75 percent by weight hexane, and having a phosphorus level of about 5,000 ppm (based on the crude oil) and provided at a transmembrane pressure of 150 psi, can be filtered through the membrane to provide a permeate at a flux of greater than 65 l/hr $m^2$ and a phosphorous level of less than about 50 ppm. Preferably, the flux will be greater than 80 l/hr $m^2$. More preferably, the level of phosphorous in the permeate will be less than about 25 ppm. For a corn oil miscella containing 25 percent by weight crude corn oil and 75 percent by weight hexane, and a phosphorous level of about 13,200 ppm at 150 psi, a filtrate will be provided at a flux of greater than about 65 l/hr m² having a phosphorous level of less than about 50 ppm. Preferably, the flux will be greater than about 75 l/hr m². Furthermore, the level of phosphorous in the permeate is preferably less than about 25 ppm. It should be appreciated that the above-identified flux values are provided under steady state conditions.

The performance of the conditioned membrane of the invention is supported by the following example. It should be understood that the example is not intended to limit the scope of the invention.

EXAMPLE

Three samples of miscella were prepared by using the present techniques. Miscella samples were obtained from three different oil seeds plants.

A membrane was conditioned and used for removing phospholipids from each of the three samples of miscella. The membrane purchased was a PAN membrane from Osmonics, Inc. The membrane can be characterized as having an average pore size of 0.3μ, and in the form of a spiral wound 25×40 membrane element. The membrane was conditioned by soaking the membrane in an intermediate solvent (propanol) for 24 hours. Then the membrane was soaked in mixture of intermediate solvent (propanol) and extraction solvent (hexane) for 24 hours. Finally, the membrane was soaked in extraction solvent (hexane) for 24 hours.

The three samples of miscella were individually processed. For the soy bean oil miscella and the canola oil miscella, test was conducted at retentate concentration of 10× of the feed concentration. The permeate rate at 10× concentration was 100 l/hr m² and 66 l/hr m² for soy bean miscella and canola oil miscella, respectively. For the corn oil, the test was conducted at retentate concentration of 7.4× of the feed at permeate rate of 80 l/hr m². The feed and permeate were analyzed, and the results are reported in table 1.

TABLE 1

Analysis of Miscella Membrane Degummed Oil

| | Soybean oil Extracted | | Corn oil Extracted | | Canola oil Extracted + Prep | |
|---|---|---|---|---|---|---|
| | Feed | Permeate | Feed | Permeate | Feed | Permeate |
| phosphorous ppm | 545 | 21 | 1783 | 41.2 | 505 | 24.4 |
| Ca, ppm | 34.2 | 1.7 | 14.4 | 0.83 | 137.5 | 8.05 |
| Mg, ppm | 26 | 1.68 | 264.4 | 5.54 | 82.4 | 4.36 |
| FFA, wt % | 0.35 | 0.14 | 2.88 | 1.78 | 0.58 | 0.46 |
| Chlorophyll, | 391 ppb | 126 ppb | NA | NA | 16.1 ppm | 10.1 ppm |
| Red | 13 | 9.3 | 70* | 30 | — | 4.0* |
| Yellow | 40 | 30 | 21.5 | 15.6 | — | 70* |
| % Solvent in Miscella | 75 | 75 | 75 | 75 | 60 | 60 |
| Filtration Rate L/hr. m² | | 100⁽¹⁾ | | 80⁽²⁾ | | 66⁽¹⁾ |

*lovibond color using a 1 inch cell
⁽¹⁾Filtration rate at 10× concentration of the feed
⁽²⁾Filtration rate at 7.4× concentration of the feed The above specification, examples and data provide a complete description of the manufacture and use of the composition of the invention. Since many embodiments of the invention can be made without departing from the spirit and scope of the invention, the invention resides in the claims hereinafter appended.

We claim:
1. A method for processing vegetable oil miscella, the method comprising steps of:
  (a) feeding vegetable oil miscella to a filter for recovery of a permeate stream and a retentate stream, wherein said miscella comprises vegetable oil solvent and crude vegetable oil containing phospholipids, and said filter comprises a polymeric membrane having an average pore size of about 0.05μ to about 3μ that is conditioned for selective separation of phospholipids from said miscella to provide a permeate stream having decreased weight percent of phospholipids compared with the weight percent of phospholipids provided in said miscella; and
  (b) recovering said permeate stream having decreased weight percent of phospholipids compared with the weight percent of phospholipids provided in said miscella.

2. A method for processing vegetable oil miscella according to claim 1, wherein the membrane that is conditioned has an average pore size of about 0.1μ to about 2μ.

3. A method for processing vegetable oil miscella according to claim 1, wherein said miscella comprises about 45 to about 90 weight percent vegetable oil solvent.

4. A method for processing vegetable oil miscella according to claim 1, wherein the vegetable oil solvent comprises hexane.

5. A method for processing vegetable oil miscella according to claim 1, wherein said permeate stream comprises less than about 0.6 wt. % phospholipids.

6. A method for processing vegetable oil miscella according to claim 1, wherein said permeate stream comprises less than about 0.15 wt % phospholipids.

7. A method for processing vegetable oil miscella according to claim 1, wherein said permeate stream comprises less than 0.015 wt % phospholipids.

8. A method for processing vegetable oil miscella according to claim 1, wherein the polymeric membrane comprises at least one of polyacrylonitrile, polysulfone, polyamide, and polyimide.

9. A method for processing vegetable oil miscella according to claim 1, further comprising steps of:
  (a) recovering said retentate stream and feeding at least a portion of said retentate stream to a second filter for recovery of a second permeate stream and a second retentate stream, wherein said feed stream fed to the second filter comprises vegetable oil solvent, vegetable oil, and phospholipids, and said second filter comprises a polymeric membrane having an average pore size of about 0.05μ to about 3μ that is conditioned for selective separation of phospholipids from said retentate stream to provide a second permeate stream having a decreased weight percent of phospholipids compared wit the weight percent of phospholipids provided in said retentate stream, and a second retentate stream having an increased weight percent of phospholipids compared with the weight percent of phospholipids provided in said feed stream; and
  (b) recovering said second retentate steam having an increased weight percent of phospholipids compared with the weight percent of the phospholipids provided in the retentate stream.

10. A method for processing vegetable oil miscella according to claim 9, further comprising a step of:
(a) separating solvent from the second retentate stream to provide a lecithin product.

11. A method for processing vegetable oil miscella according to claim 9, further comprising a step of:
(a) preparing the feed stream by adding vegetable oil solvent to the retentate stream.

12. A method for processing vegetable oil miscella according to claim 9, further comprising steps of:
(a) recovering said permeate stream and feeding at least a portion of said permeate stream as a feed stream to a third filter for recovery of a third permeate stream and a third retentate stream, said third filter comprises a polymeric membrane having an average pore size of about 0.05µ to about 3µ that is conditioned for selective separation of phospholipids from said second permeate stream to provide a third permeate stream having a decreased weight percent of phospholipids compared with the weight percent of phospholipids provided in said feed stream; and
(b) recovering said third permeate stream having decreased weight percent phospholipids compared with the weight percent of phospholipids provided in the feed stream.

13. A method for processing vegetable oil miscella according to claim 1, further comprising a step of:
(a) filtering said vegetable oil miscella to provide a vegetable oil miscella having a solids content of less than about 10 ppm, prior to said step of feeding vegetable oil miscella to a first filter.

14. A method for preparing vegetable oil miscella according to claim 1, wherein the filter comprises the polymeric membrane provided on a backing.

15. A method for processing vegetable oil miscella according to claim 1, further comprising:
(a) flushing the conditioned membrane with extraction solvent for a time sufficient to remove phospholipids from said membrane.

16. A method for processing vegetable oil miscella according to claim 1, wherein the membrane that is conditioned has an average pore size of about 0.05µ to about 2µ.

17. A method for processing vegetable oil miscella according to claim 1, wherein the membrane that is conditioned has an average pore size of about 0.1µ to about 2µ.

18. A method for processing vegetable oil miscella according to claim 1, wherein the membrane comprises a polyacrylonitrile membrane.

19. A method for processing vegetable oil miscella according to claim 1, wherein the membrane comprises a polysulfone membrane.

* * * * *